Figure 1:
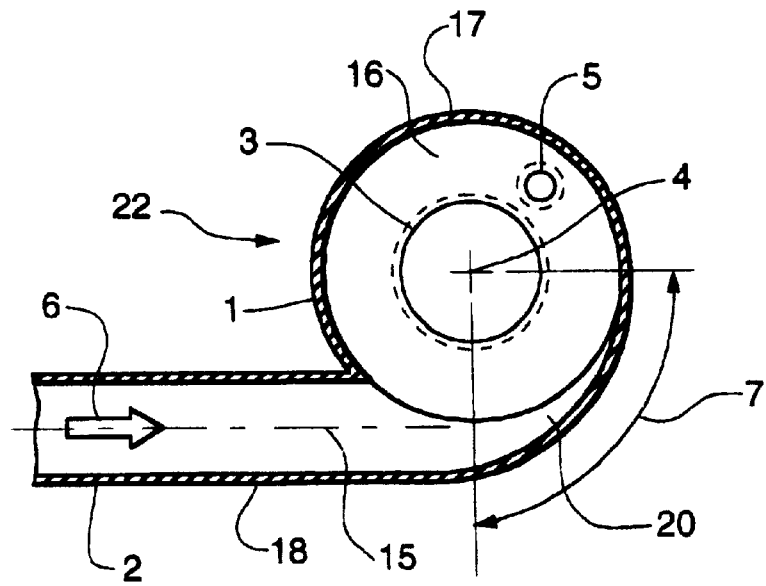
Figure 2:
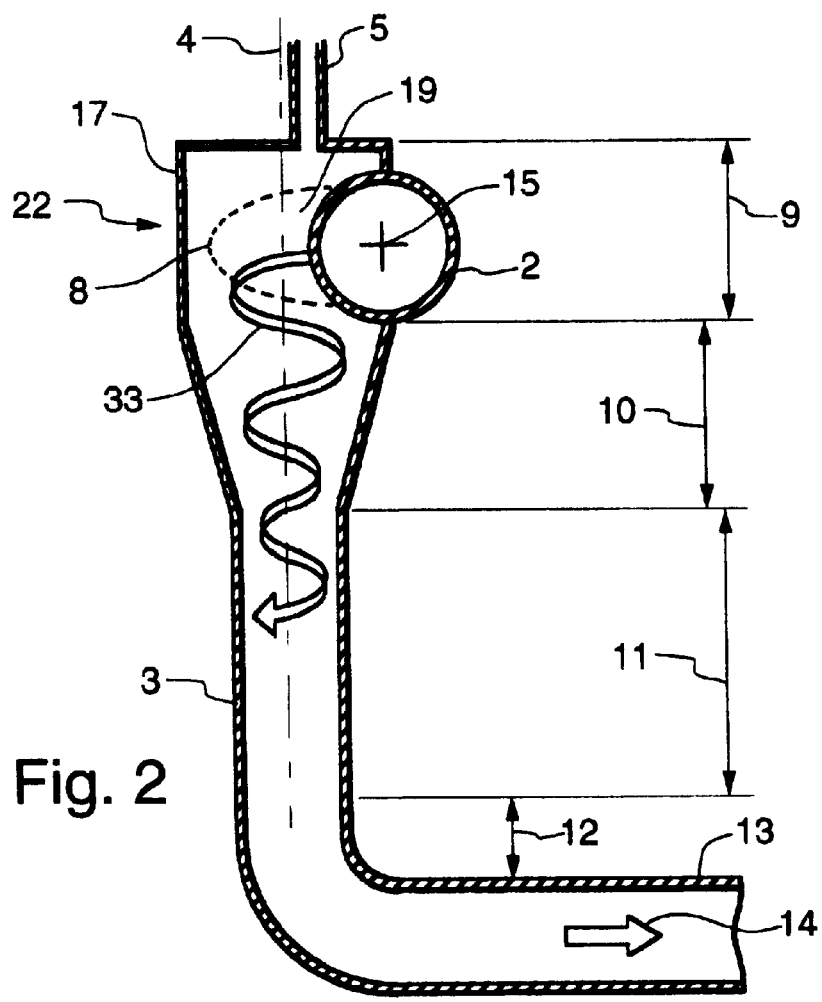
Figure 3:
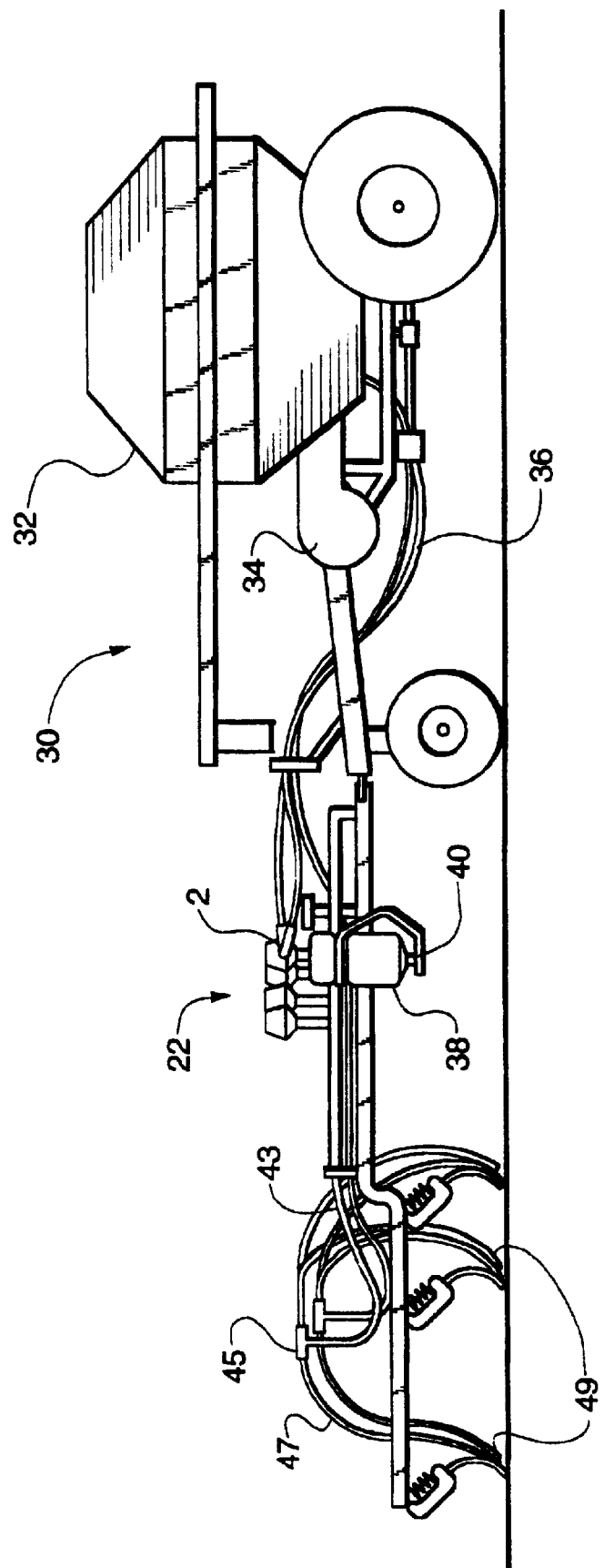

United States Patent
Memory et al.

[19]

[11] Patent Number: 6,155,185
[45] Date of Patent: Dec. 5, 2000

[54] METHOD AND APPARATUS FOR COATING SEEDS

[75] Inventors: Russell J. Memory; Danick Joseph Bardi, both of Saskatoon, Canada

[73] Assignee: Flexi-Coil Ltd., Saskatoon, Canada

[21] Appl. No.: 09/353,396

[22] Filed: Jul. 15, 1999

Related U.S. Application Data

[63] Continuation of application No. 08/794,884, Feb. 4, 1997, abandoned.

[30] Foreign Application Priority Data

Feb. 7, 1996 [CA] Canada .................................. 2169008

[51] Int. Cl.⁷ ..................................................... A01C 1/06
[52] U.S. Cl. ........................................... 111/200; 111/905
[58] Field of Search ..................................... 111/200, 900, 111/917, 905; 47/57.6

[56] References Cited

U.S. PATENT DOCUMENTS

| | | | |
|---|---|---|---|
| 2,579,732 | 12/1951 | Funsten et al. ................................ | 47/1 |
| 3,442,221 | 5/1969 | Phillips et al. ....................... | 111/917 X |
| 3,460,492 | 8/1969 | Dickinson, III et al. ........... | 111/905 X |
| 3,648,631 | 3/1972 | Fiedler et al. ....................... | 111/917 X |
| 3,653,550 | 4/1972 | Williams ............................. | 111/900 X |
| 3,911,183 | 10/1975 | Hinkes ................................. | 47/57.6 X |
| 4,068,602 | 1/1978 | Mickus et al. ...................... | 111/900 X |
| 4,240,365 | 12/1980 | Amburn ............................... | 111/905 X |
| 4,245,432 | 1/1981 | Dannelly .................................. | 47/57.6 |
| 4,356,934 | 11/1982 | Knake .................................. | 111/905 X |
| 4,503,803 | 3/1985 | Barnes ................................ | 111/905 X |
| 5,161,473 | 11/1992 | Landphair et al. ................. | 111/900 X |
| 5,497,232 | 3/1996 | Watano et al. .......................... | 356/335 |
| 5,567,238 | 10/1996 | Long, Jr. et al. ....................... | 118/303 |
| 5,750,996 | 5/1998 | Drennen, III et al. .............. | 250/341.2 |

FOREIGN PATENT DOCUMENTS

| | | | |
|---|---|---|---|
| 865169 | 9/1981 | U.S.S.R. ................................ | 111/905 |
| 1169554 | 7/1985 | U.S.S.R. ................................ | 111/905 |

*Primary Examiner*—Christopher J. Novosad
*Attorney, Agent, or Firm*—Griffin & Szipl, PC

[57] ABSTRACT

A seed treating device is mounted on a seeding implement to treat untreated seeds carried by the implement with inoculants or other treating material before the seeds are planted into the ground. The implement conveys seeds in a flow of air carried by conduits to entrain the seeds within the air flow. The seed treating unit is placed on the implement remote from the storage tank for the seeds to receive airborne seeds from an inlet tube, treat the seeds with a coating material, and discharge the seeds through an outlet tube to planting mechanisms. The seed treating unit includes a conical mixing chamber to induce the air/seed flow into a whirling motion where the coating material is introduced for an even coating of the individual seed particles. The inlet line is oriented generally tangential to the circular mixing chamber, while the outlet line is generally perpendicular to the inlet line and is centrally connected to the main axis of the mixing chamber.

17 Claims, 3 Drawing Sheets

6,155,185

METHOD AND APPARATUS FOR COATING SEEDS

CROSS-REFERENCE TO RELATED APPLICATIONS

This application is a continuation of U.S. patent application Ser. No. 08/794,884, filed on Feb. 4, 1997, now abandoned, the contents of which are incorporated herein by reference.

BACKGROUND OF THE INVENTION

This invention relates generally to a mechanism for coating an airborne stream of small granular items, such as seeds, with a substance in liquid or liquid-like form, including a powdered solid, and, more particularly, relates to the use of a on-board seed coating apparatus for air seeders and the like. A particular example of the use of the invention lies in agricultural implements such as seed drills in which the implement carries, or operates with, a reservoir of seeds, and is effective to transfer the seeds into the ground over a substantial area while moving across the field. The invention may be utilized for coating seeds with agriculturally-effective substances, such as inoculants, fungicides, etc.

Seeding implements are well known. Implements such as air seeders convey the seeds from the reservoir to the seed deposition outlets of the implement by means of a flow of air through conduits. The air flow is derived from a fan or air compressor, which typically is mounted on the implement and powered by the prime mover, normally a tractor.

Typical known seed coating processes for coating seeds have generally been carried out on an in-factory basis. That is to say, machinery is provided in which, for example, seeds are mixed with a coating material in a fluidized bed arrangement. Because the coating process is carried out in-factory, it is a relatively easy matter to ensure good quality control, especially as regards the thickness of the coating, and as regards the evenness of the thickness, over the seed, and seed to seed. When the coating is factory-applied, inevitably a long time must elapse between the application of the coating and the insertion of the seed into the ground.

Another known method of coating seed is the mixing of batches of seed with treatment fluid on the farm prior to placing the seed in the air cart tank. This system is inefficient and requires the operator/farmer to handle the coated seed in some manner. Seed coated in this manner must be used within a limited time frame of when it is coated, and thus coated-seed not planted within a given time frame becomes wasted. This translates to losses due to the costs of wasted seed and wasted treatment fluids. This method also requires cleanup of the air cart tanks and loading equipment after treated seed is handled.

An important requirement is that the seed be coated evenly, not only over the surface of each seed particle, but also from seed to seed. Accordingly, an important goal would be the application of the coating to the seeds without compromising evenness and controllability of the coating, even though the coating operation is done actually on the air seeder, and takes place even as the operation of seeding is being carried out.

SUMMARY OF THE INVENTION

It is an object of the instant invention to provide a mixing chamber design to enhance the treatment of seeds on the air seeder before the seed is inserted into the ground.

It is still another object of this invention to provide a seed treatment system that can be mounted as an integral part of an air cart, particularly within the air cart manifold.

Using the improved seed treatment system design described below to treat seed in the air manifold after it has been metered into the air stream from the cart tank has several advantages, including: the tank and metering systems of the air cart remain clean because treatment fluids do not come into contact with the tank or metering components; and the seed is treated in the air stream on its way to the planting implement. Thus the time lag between when the seed is treated and when it is in the furrow is a matter of seconds. The treatment is fresh and any wasting of treatment and seeds is reduced.

With respect to agricultural equipment, it is a feature of this invention that the implement is required to be of the kind in which the seeds are moved from a seed repository through a pipe or conduit, by virtue of the seeds being borne along in a moving flow of air within the conduit.

It is an advantage of this invention that the coating is applied to the seeds after the seeds have become airborne, and are traveling on their way to the seed depositors.

It is another feature of this invention that the seeds are passed through a seed coating chamber in which a whirling motion of the air flow is induced.

It is another object of this invention that the whirling motion of the air flow be induced in a generally circular path centered around the longitudinal axis of the coating chamber, during which the seeds remain for a short residence time of approximately a second or two.

It is still another object of this invention to arrange the airflow and conduit geometry in such a manner that substantially all of the seeds undergo approximately the same whirling motion and have about the same residence time with the chamber.

It is still another feature of this invention that the coating substance is introduced into the coating chamber in such a manner that the coating substance is borne around the chamber with the seeds.

It is still another advantage that the coating substance can be introduced into the coating chamber as a drip or a spray to provide a generally uniform thickness to the coating material on the seed.

Since each seed spends approximately the same amount of time being whirled about within the coating chamber exposed to the coating material, each seed has approximately the same exposure to the coating substance and tends to result in an even spread over the seeds.

It is yet another feature of this invention that the numerical density of the seeds in the air flow passing through the coating chamber be fairly low, as the evenness of the coating material on the seeds would be more difficult to attain if the density of seeds were high.

It is a further object of this invention to provide a method of coating seeds while being conveyed from a reservoir to the mechanism for depositing the seeds into the ground.

It is still a further object of this invention to provide a method and apparatus for coating seeds on an agricultural seeding implement which is durable in construction, inexpensive of manufacture, carefree of maintenance, facile in assemblage, and simple and effective in use.

These and other objects, features and advantages can be accomplished according to the instant invention by a seed treating device mounted on a seeding implement to treat untreated seeds carried by the implement with inoculants or other treating material before the seeds are planted into the ground. The implement conveys seeds in a flow of air carried by conduits to entrain the seeds within the air flow. The seed treating unit is placed on the implement remote from the storage tank for the seeds to receive airborne seeds from an inlet tube, treat the seeds with a coating material, and discharge the seeds through an outlet tube to planting mechanisms. The seed treating unit includes a conical mixing chamber to induce the air/seed flow into a whirling motion where the coating material is introduced for an even coating of the individual seed particles. The inlet line is oriented generally tangential to the circular mixing chamber, while the outlet line is generally perpendicular to the inlet line and is centrally connected to the main axis of the mixing chamber.

BRIEF DESCRIPTION OF THE DRAWINGS

The advantages of this invention will be apparent upon consideration of the following detailed disclosure of the invention, especially when taken in conjunction with the accompanying drawings wherein:

FIG. 1 is a cross-sectional view representing the top plan view of the seed coating chamber and connected conduit incorporating the principles of the instant invention;

FIG. 2 is a cross-sectional view representing an elevational view of the seed coating chamber and associated conduit;

FIG. 3 is a schematic side elevational view of an air seeder incorporating the principles of the instant invention to coat seed being conveyed from the seed storage tank to the apparatus for depositing the treated seeds into the ground;

FIG. 4 is a top plan view similar to that of FIG. 1, but of an alternative embodiment ofthe instant invention; and FIG. 5 is a side elevational view of the alternative embodiment of the invention depicted in FIG. 4.

DETAILED DESCRIPTION OF THE PREFERRED EMBODIMENT

The preferred embodiment of the particulate coating apparatus 22, comprising the instant invention, is best seen in FIGS. 1 and 2. FIG. 3 depicts the deployment of the apparatus 22 on an agricultural air seeder 30 wherein the relatively heavy and irregular particulate material, which may comprise either or both of seed or fertilizer, is carried or transported by a high velocity air stream at a relatively low number of particles per unit volume of air (hereinafter "density").

The mixing chamber 1, as best seen in FIG. 1, has a generally circular cross-section 16 and a main axis 4 which is preferably oriented vertically. A high velocity air stream carries a low-density of particulate material as an inlet stream 6 into the mixing chamber 1 along an inlet axis 15 through an inlet tube 2 and along an extension 7 that is preferably smoothly formed into the wall of the mixing chamber 1. The inlet axis 15 is offset from the main axis 4 and preferably lies in the plane of the cross-section 16. The extension 7 preferably is a circumferential extension of a portion of the inlet tube wall 18 formed in the exterior wall 17 of the mixing chamber 1. The extension 7 is preferably tapered in both width 19 and depth 20 so as to minimize loss of energy as the air stream changes direction into the mixing chamber 1. The air stream and the material (seed and/or fertilizer) entrained therein are redirected by the extension 7 to a swirling vortex motion in the mixing chamber 1 about the main axis 4 with a vertical component of the motion being along the main axis 4 toward the outlet tube 3.

A coating fluid inlet 5 into the mixing chamber 1 is provided in an offset manner from the main axis 4 by a substantial portion of the radius of the cross-section 16. A coating material, preferably liquid material, is introduced into the mixing chamber through the inlet 5 at a controlled rate of flow. Referring now to FIG. 2, the elevation of the particulate coating apparatus 22 is shown. The mixing chamber 1 preferably includes a generally cylindrical section 9 and a vertically depending tapered section 10 with a reducing cross-section to the outlet tube 3, all of which are generally aligned with the main axis 4 and depending from the mixing chamber 1.

The particulate coating apparatus 22 may optionally be connected with a horizontally running delivery or transport tube 13 by a curved section of tubing 12, as best seen in FIG. 2. Optimally, the air stream 14 exiting from the tube 13 comprises a high speed air stream with centrally entrained and coated seed or other particulate material.

Referring now to FIG. 3, one skilled in the art will recognize a generally conventional air seeder 30 on which the seed coating apparatus 30 incorporating the principles of the instant invention is employed. The implement 30 is adapted for towing by a conventional prime mover, a tractor (not shown). Seeds are stored in a seed reservoir tank 32. A fan 34 creates a flow of air through conduits 36 which are associated with the seed reservoir tank 32 to receive seeds therefrom into the air stream through the conduits 36, which are divided as required and coupled to the inlet tubes 2 of corresponding seed coating devices 22 supported on the implement 30. Preferably, the seed coating devices 22 are arranged in a line across the implement 30, i.e. laterally across the width of the implement, transverse to the direction of travel of the implement 30.

A coating substance reservoir 38 is supported on the frame of the implement 30. Metering pumps 40 convey pre-set flow rates of the coating material into the transversely disposed mixing chambers 1. Usually, the each device 22 should receive the same volumetric flow rate of the seed coating fluid, given that each device 22 receives the same air-flow rate and the same density of seeds in that air flow. Coating thickness detectors, flow sensors, and feedback control of the coating material flow rates may be included on the implement 30, as required. The metering pumps 40 may be of the peristaltic type, or other positive displacement type having accurate volumetric controllability at low flow rates.

The outlets 3 of the devices 22 are connected to and in flow communication with corresponding transport tubes 43. The transport tubes 43 deliver coated seed to distributors 45 that operate to distribute the coated seeds to a plurality of delivery tubes connected to the seed deposition outlets 49 for depositing the coated seeds into the ground.

The positioning of the inlet 5 for the introduction of coating material into the mixing chamber 1 is important to the proper operation of the device 22. As depicted in FIG. 1, the coating fluid inlet 5 is located at about the 10 o'clock position in that view, where the center of the air/seed inlet tube 2 is at about the 6 o'clock position. In FIG. 1, the seeds and the air are well established in the whirling pattern within the chamber 1 before the coating material is introduced to the flow. In some cases, however, it would be preferable to introduce the coating material earlier with respect to the introduction of the flow of air and seed into the mixing chamber 1. For example, the coating material inlet 5 could be located at a position corresponding to the beginning of the whirling motion of the air/seed flow, for example, at the 3 o'clock position, as is shown in FIG. 4. In typical applications of the seed coating unit 22, good results have been obtained when the coating fluid inlet 5 is positioned between the 1 o'clock position and the 5 o'clock position, in the plan view relative to that described above.

If the coating material is introduced into the mixing chamber 1 through the inlet 5 too late in the whirling pattern of the air/seed flow, the seeds will be almost through the mixing chamber 1 before coming into contact with the coating material, resulting in a lack of treating material on the seeds or a spotty, irregular coating thereof If the coating material in introduced into the air/seed flow too early, i.e. before the whirling motion has become established, the coating would tend to be streamlined in with the air/seed flow, as opposed to being picked up in a whirling flow, which would also result in an uneven coating on the seeds.

It may be noted that the radius at which the coating material inlet 5 is positioned is also important to the proper operation of the seed treating unit 22. If the coating material inlet 5 is at too great a radius from the center 4 of the mixing chamber 1, the incoming drops of fluid are introduced too close to the wall 17 of the chamber 1, resulting in a greater probability that the drop of coating fluid would condense on the wall 17. If the fluid condenses on the wall 17, that drop of fluid is unlikely to be available for coating seeds whirling within the mixing chamber 1. Even if that drop of treating fluid does become entrained in the downstream flow, that drop is unlikely to become applied to the seed as an even coating thereon. From this standpoint, the coating material inlet mouth 5 should be located no further out from the center 4 than ¾ of the radius of the mixing chamber 1.

Equally, the radius at which the coating substance inlet 5 is located should not be too small. If the drops of the coating fluid were to be placed too close to the center 4 of the mixing chamber 1, the coating fluid might tend to pass straight through the mixing chamber 1 to the outlet 3 without mixing with the seeds, since the whirling motion or velocity of the air/seed flow is not too great at the center 4 of the mixing chamber 1. From this standpoint, the coating material inlet 5 should be located no less than about ⅓ of the radius of the mixing chamber 1.

It will be recognized by one skilled in the art that the evenness of the coating of the treating material on the seeds is controllable by the device 22 as described above, because the density of the seeds is such that the seeds remain airborne and entrained within the air flow. If the seed concentration were at a density that was too high (for example, if the seeds were replaced with steel ball bearings) the seeds would simply run down around the walls 17 of the chamber 1 and would, therefore, not undergo the whirling motion. It is a matter of density, and the seeds should be of such a density that the seeds, in passing through the various tubes and chambers of the implement 30 and the seed coating device 22, remain airborne so as to be capable of being whirled around the mixing chamber I without simply running down the walls 17.

The seeds have to be light enough to be carried within the air flow substantially without hitting the walls of the conduits. Thus, when the air flow passes around bends and elbows, or otherwise change direction, the seeds are carried around with the flow of air. It will be recognized by one skilled in the art that the coating of the treating material on the individual seed is even primarily because of the seeds undergoing a whirling motion within the mixing chamber 1. Not only are seeds of a nature that they will undergo that kind of motion, when a whirling motion is introduced, but the coating material can be caused to "fly" with, and thereby mix with, the whirling seeds.

Figure 4:
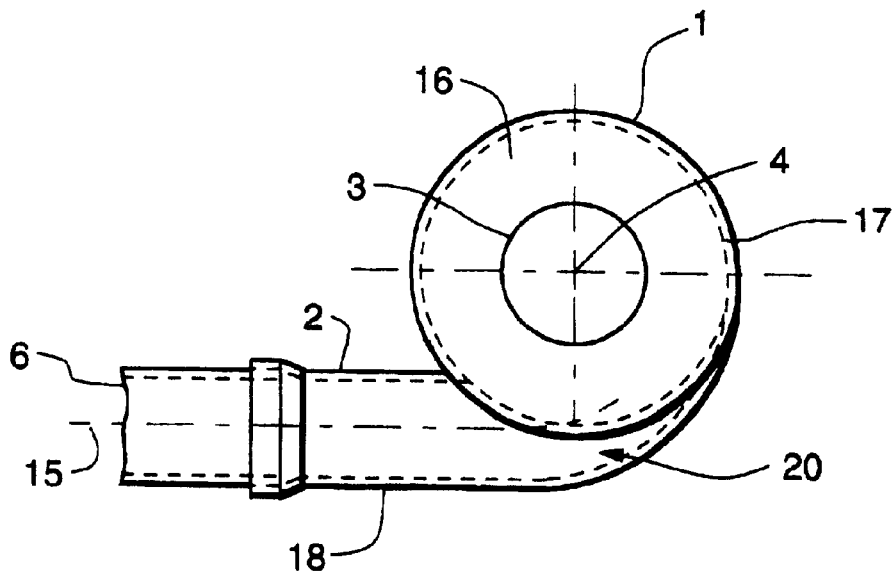
Figure 5:
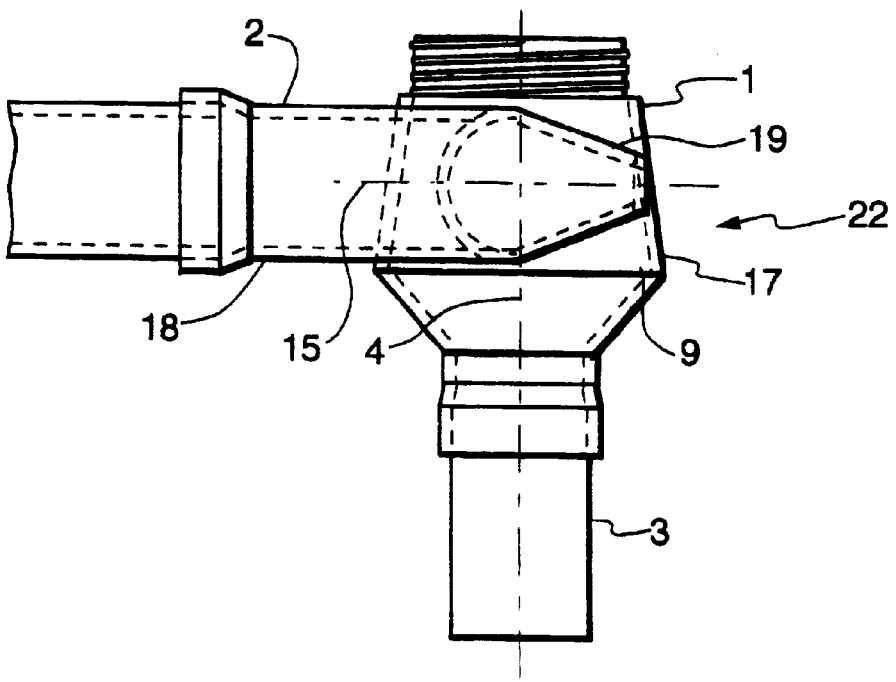

It may be noted that the mixing chamber 1 is essential to the success of the operation of this type of seed treating device 22. If the coating material were simply introduced through a hole in the tube without some induced whirling motion, the drops of treating fluid would simply be carried along with the air flow, with little tendency to be applied to the seed particles, especially in an even coating. The whirling motion is induced into the air/seed flow by the shape of the mixing chamber 1. It will be recognized by one skilled in the art that the inducement of a whirling motion to an air/seed flow is not easy. It is important that the seeds are not flung too vigorously against the walls 17 of the chamber 1, which can easily damage the seeds or result in an uneven coating of the treating material thereon. To reduce the possibility of the seeds within the air/seed flow striking the walls 17 of the chamber 1 before the swirling motion is established, the inlet tube 2 is curved somewhat, as depicted in the drawings. As a result, the seeds undergo a smooth, gentle transition from the substantially linear motion within the inlet conduits 2 to the whirling motion in the mixing chamber 1. As shown best in FIG. 4, the curvature of the inlet tube 2 is such that the tube 2 meets the chamber 1 at the 30 degree angle as shown. The inlet tube 2 has a radius of curvature at that point equal to a little more than the diameter of the chamber 1.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. In an agricultural implement for planting seeds and having a mobile frame, a hopper supported on said frame for carrying a supply of seeds, at least one planter unit for inserting said seeds into the ground, an air delivery system operably associated with said hopper to convey seeds through a seed delivery line extending from said hopper to said at least one planter unit by entraining said seeds in a flow of air directed through said seed delivery line, the improvement comprising:

a seed treating unit operably connected to said seed delivery line to treat said seeds as said seeds are being conveyed from said hopper to said at least one planter unit, said seed treating unit including a circular chamber coupled to said seed delivery line to receive said flow of air and entrained seeds therefrom and effect a swirling action to said seeds within said chamber before exiting said chamber, said chamber being connected to a supply of seed treatment material for the coating of said seeds while swirling in said chamber, said chamber being generally circular in cross-section and having a radius extending from a center of said circular cross-section to an outer circumference, said opening being located at a distance from said center of said chamber in a range of one-third to three-quarters of said radius.

2. The agricultural implement of claim 1 wherein said seed treatment material is fed into said chamber through an opening in an upper surface of said chamber.

3. The agricultural implement of claim 2 wherein said seed delivery line includes an inlet line extending from said hopper to said chamber and an outlet line extending from said chamber to said at least one planter unit, both said inlet line and said outlet line being connected to said chamber so as to be in flow communication therewith, said inlet line being connected tangentially to said chamber to induce a vortex flow of air within said chamber before exiting said chamber into said outlet line.

4. The agricultural implement of claim 3 wherein said inlet line is connected to said chamber via a transitional member to direct said air flow in to said vortex.

5. The agricultural implement of claim 4 wherein said outlet line is mounted coaxially with said chamber and extends downwardly therefrom, said inlet line being connected to said chamber above said outlet line.

6. The agricultural implement of claim 5 wherein said chamber includes a top member and said opening is located in said top member downstream with respect to said air flow from said transitional member.

7. The agricultural implement of claim 5 further comprising a reservoir for carrying a supply of seed treatment material and a metering device for delivering a flow of seed treatment material at a pre-selected rate from said reservoir into said chamber through said opening.

8. The agricultural implement of claim 1 wherein said chamber has a frusto-conical configuration with an outlet line being connected to a minimum diameter portion of said chamber.

9. The agricultural implement of claim 8 further comprising a plurality of planter units being operable associated with said seed treating unit.

10. An air seeder for planting seeds in the ground, comprising:

a mobile frame;

a hopper mounted on said frame to provide a supply of seeds;

a plurality of planter units engageable with the ground to plant said seeds therein;

an air delivery mechanism operatively intercoupling said hopper and said planter units to deliver said seeds from said hopper to said planter units for insertion into the ground, said air delivery mechanism including, a fan for creating a flow of air, and a conduit associated with said fan and being operatively coupled with said hopper to entrain said seeds within said flow of air and with said planter units to convey said entrained seeds thereto, said conduit being divided into an inlet portion extending from said hopper to said seed treatment apparatus and an outlet portion extending from said seed treatment apparatus to deliver treated seeds toward said planter units; and a chamber having a cylindrical cross-sectional configuration and being operatively coupled to said conduit between said hopper and said planter units to receive said flow of air and entrained seeds therefrom and effect a swirling action to said entrained seeds within said chamber before exiting said chamber to place a coating of treatment material on said entrained seeds as said entrained seeds are being conveyed from said hopper to said planter units, said inlet portion of said conduit being connected to said chamber in a tangential manner at an upper portion of said chamber.

11. The air seeder of claim 1 wherein said chamber is connected to both said inlet and outlet portions of said conduit, said chamber being operable to receive said entrained seeds and to create a vortex in which said treatment material is coated on said entrained seeds before being discharged from said chamber into said outlet portion of said conduit.

12. The air seeder of claim 11 wherein said chamber has a frusto-conical shape with a minimum diameter portion lower than a maximum diameter portion, said inlet portion of said conduit being connected to said maximum diameter portion, said outlet portion being connected in a co-axial manner to said minimum diameter portion of said conduit.

13. The air seeder of claim 12 wherein said inlet portion of said conduit is connected to said chamber through a curved transition member to urge said flow of air into said vortex.

14. The air seeder of claim 13 wherein said chamber includes a top member having an opening therein for dispensing said seed treatment material into said chamber, said opening being located in said top member downstream with respect to said flow of air through said transition member into said chamber.

15. The air seeder of claim 14 further comprising a reservoir for carrying a supply of seed treatment material and a metering device for delivering a flow of seed treatment material at a pre-selected rate from said reservoir into said chamber through said opening.

16. The air seeder of claim 15 wherein said maximum diameter portion has a radius extending from a center point to an outer circumference of said chamber, said opening being located at a distance from said center point in a range of one-third to three-quarters of the radius of said maximum diameter portion.

17. A method of planting seeds in the ground with an air seeder, comprising the steps of:

conveying seeds entrained within a flow of air created by an air delivery system through a conduit extending from a hopper containing a supply of said seeds toward a plurality of planter units mounted for engagement with the ground and for planting said seeds therein;

intercepting said seeds entrained within said flow of air through said conduit;

swirling said seeds in a vortex created by said flow of air within a generally circular chamber connected to said conduit before discharging said seeds from said chamber toward said planter units;

injecting a seed treatment material into said chamber during said swirling step by dropping said seed treatment material through an opening in a top member of said chamber to create treated seeds, said opening being located within the range of one-third to three-quarters of a radius dimension of said chamber at said top member from a center position of said top member; and planting said treated seeds in the ground.

* * * * *